United States Patent [19]

Kaminaga et al.

[11] Patent Number: 5,730,768
[45] Date of Patent: Mar. 24, 1998

[54] AUTOMOTIVE AIR CLEANER CASING

[75] Inventors: Kouichi Kaminaga, Anjyo; Ryuji Kanzaka, Achi-ken, both of Japan

[73] Assignee: Toyota Jidosha Kabushiki Kaisha, Toyota, Japan

[21] Appl. No.: 633,239

[22] Filed: Apr. 16, 1996

[30] Foreign Application Priority Data

Apr. 24, 1995 [JP] Japan ................................. 7-098392
Jan. 4, 1996 [JP] Japan ................................. 8-000027

[51] Int. Cl.$^6$ ................................. B01D 50/00
[52] U.S. Cl. ....................... 55/385.3; 55/502; 55/503; 55/493
[58] Field of Search ................... 55/493, 497, 501, 55/511, DIG. 31, 502, 503, 504, 385.3

[56] References Cited

U.S. PATENT DOCUMENTS

| | | | |
|---|---|---|---|
| 4,725,296 | 2/1988 | Kurotobi | 55/497 |
| 5,213,596 | 5/1993 | Kume et al. | 55/497 |
| 5,569,311 | 10/1996 | Oda et al. | 55/497 |

FOREIGN PATENT DOCUMENTS

| | | |
|---|---|---|
| 62-12768 U | 1/1987 | Japan . |
| 5-57249 U | 7/1993 | Japan . |

*Primary Examiner*—Jay H. Woo
*Assistant Examiner*—Robert Hopkins
*Attorney, Agent, or Firm*—Kenyon & Kenyon

[57] ABSTRACT

In an air cleaner casing 10 including an upper casing 11 and a lower casing 12, a stopper mechanism is formed in the upper casing 11 and the lower casing 12 to prevent relative movement between the upper casing 11 and the lower casing 12 after assembly. The air cleaner casing 10 has a hinge pin 17 and a hinge retainer 18 for receiving the hinge pin 17 therein. The hinge retainer 18 has a lateral U-shaped cross section having opposed surfaces 18a and 18b, at least one of which is tapered.

20 Claims, 5 Drawing Sheets

AUTOMOTIVE AIR CLEANER CASING

BACKGROUND OF THE INVENTION

1. Field of the Invention

The present invention relates to an automotive air cleaner casing.

2. Description of Related Art

As disclosed in, for example, Japanese Utility Model Publication No. 5-57349, an automotive air cleaner casing for an air cleaner includes a pair of casings, an upper casing and a lower casing, both having opposed ends between which a peripheral portion of a filter element is held via a rubber seal member. The upper casing and the lower casing are hinge-coupled to each other at one side of the air cleaner casing and are clamped to each other at the side opposite the hinge-coupled side. This configuration permits easy insertion of the filter element into the casing. Coupling and decoupling of the hinge between the upper casing and the lower casing is possible only when the upper casing and the lower casing are substantially perpendicular to each other.

In automobiles, however, the space around the air cleaner is limited. Accordingly, exchanging the filter element is difficult because an operator must rotate the upper casing to be substantially perpendicular to the lower case.

To improve the exchangeability of a filter element, Japanese Patent Application No. HEI 6-205150 was filed on 31 Aug., 1994 where, as illustrated in FIGS. 7 and 8, an upper casing 1 is slid and coupled to the lower casing 2. The sliding direction is parallel to a dividing surface 3 of the casing. When the upper casing is slid relative to the lower casing, the upper casing 1 is inclined by angle θ, with respect to the lower casing by a guide 6. This configuration inhibits inadvertent displacement of a seal rubber 5 holding a filter element 4. After a hinge pin 7 has entered a hinge retainer 8, the upper casing 1 is rotated to make angle θ equal to zero.

The above-described slide-coupling-type air cleaner casing suffers from the following problems.

First, after the upper casing 1 has been coupled to the lower casing 2, as shown in FIG. 9, the upper casing 1 may be dislocated in direction R, reverse to the sliding direction S, with respect to the lower casing 2. This dislocation creates an insufficient seal area.

Second, to insert the hinge pin into the hinge retainer, a clearance is required between the hinge pin and the hinge retainer. In this configuration, the hinge pin rattles in the hinge retainer when intake air flow pulsations vibrate the upper casing and the lower casing. This results in an increased dislocation of the upper casing with respect to the lower casing and noise problems.

SUMMARY OF THE INVENTION

An object of the present invention is to provide an automotive air cleaner casing having a lower casing and an upper casing, which is slid and coupled to the lower casing, wherein dislocation between the upper casing and the lower casing—due to movement of the upper casing in a direction reverse to a coupling direction and/or rattling of a hinge pin in a hinge retainer—is suppressed.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION

Figure 1:
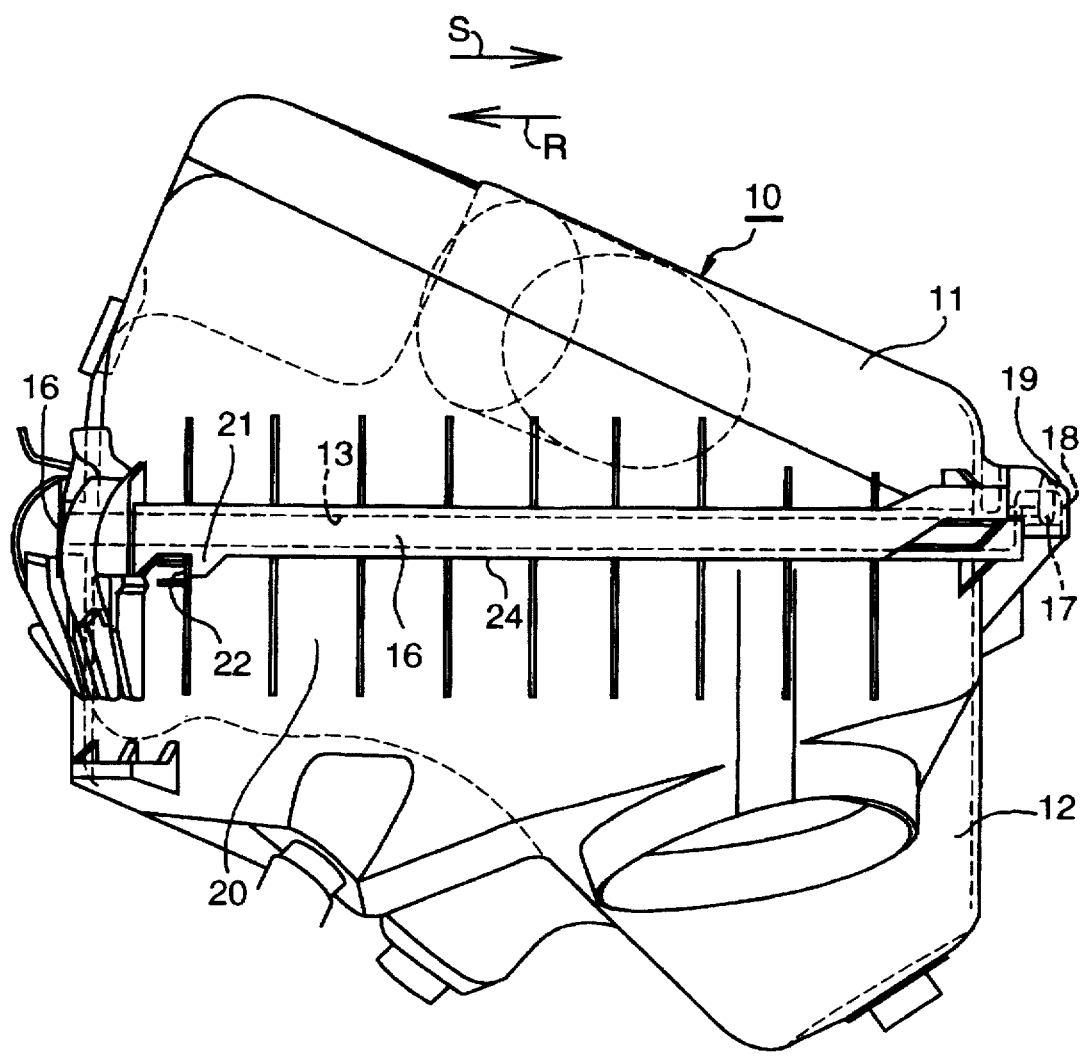
FIG. 1 is a side elevational view of an air cleaner casing for an automobile air cleaner applicable to any embodiment of the present invention.
Figure 2:
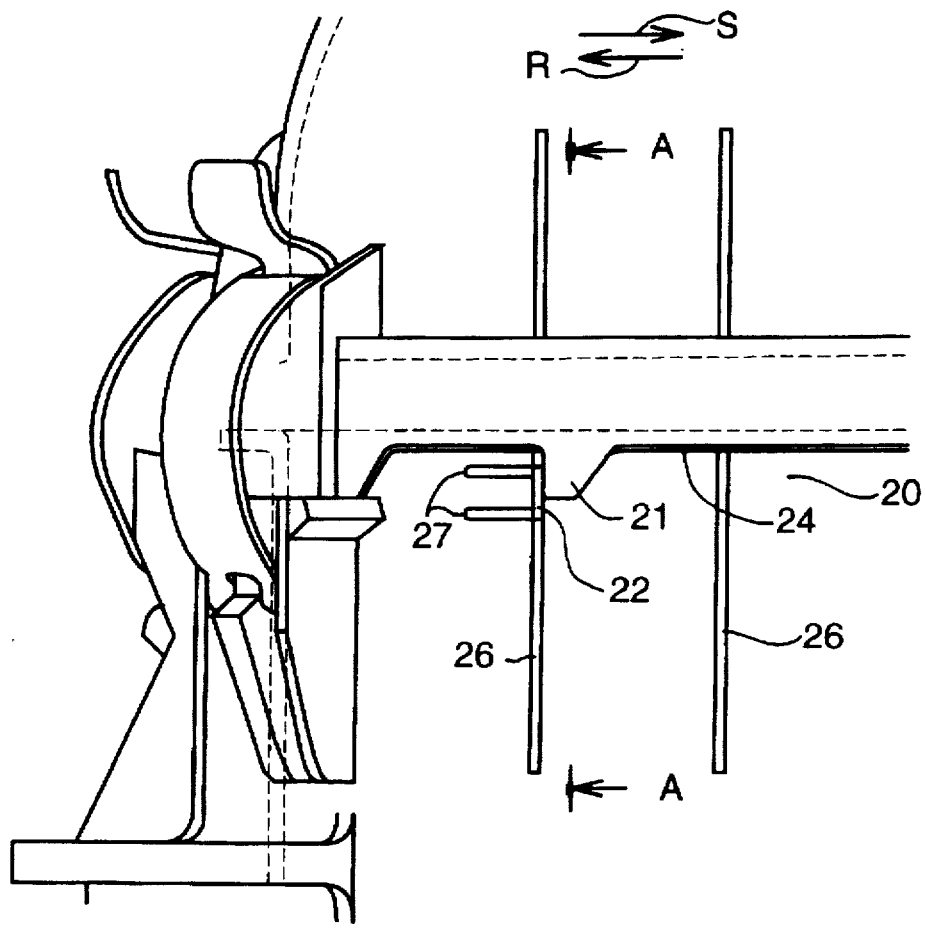
FIG. 2 is a partial, enlarged side elevational view of the air cleaner casing of FIG. 1.
Figure 3:
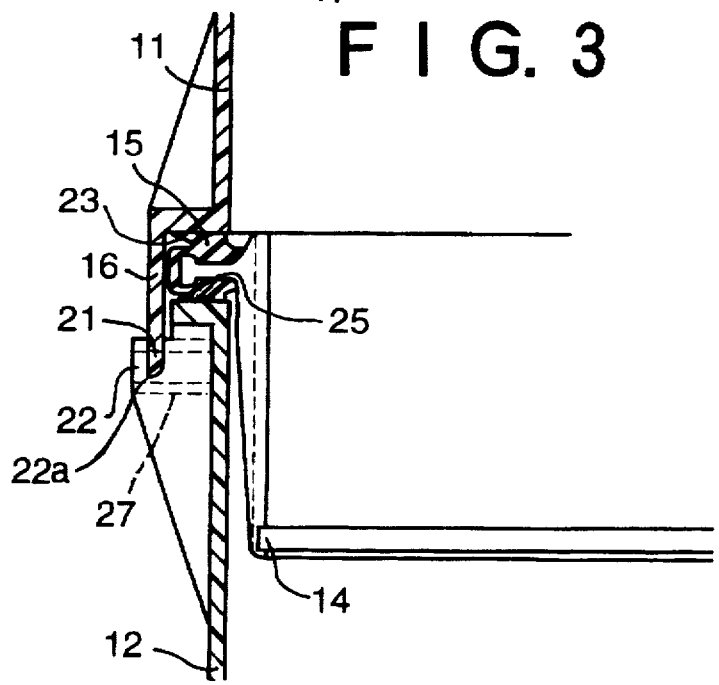
FIG. 3 is a cross-sectional view of the air cleaner casing taken along line A—A of FIG. 2.
Figure 4:
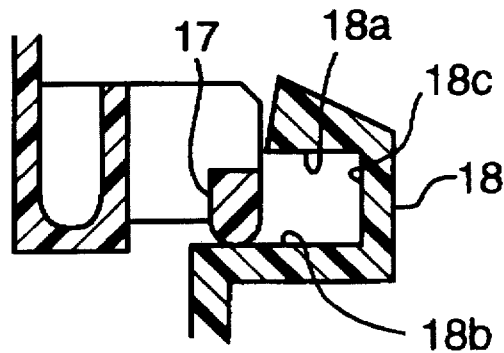
FIG. 4 is an enlarged cross-sectional view of a hinge of an automotive air cleaner casing according to a first embodiment of the present invention.
Figure 5:
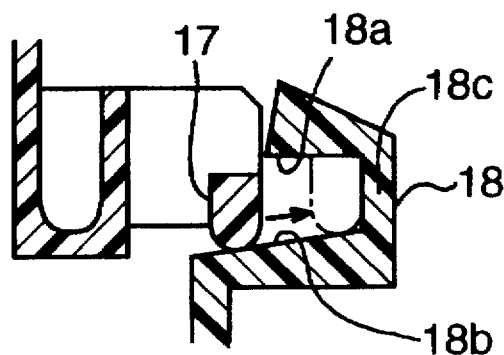
FIG. 5 is an enlarged cross-sectional view of a hinge of an automotive air cleaner casing according to a second embodiment of the present invention.
Figure 6:
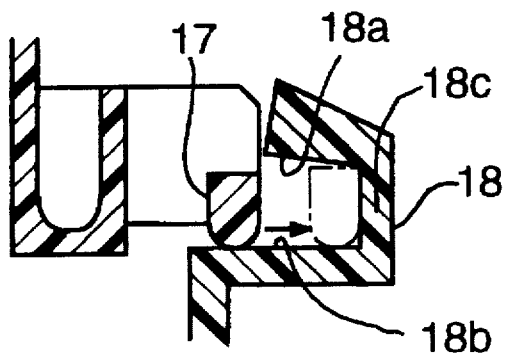
FIG. 6 is an enlarged cross-sectional view of a hinge of an automotive air cleaner casing according to a third embodiment of the present invention.

FIGS. 1–4 illustrate an air cleaner casing according to a first embodiment of the present invention, FIG. 5 illustrates a second embodiment of the present invention, and FIG. 6 illustrates a third embodiment of the present invention. Structural portions common to all of the embodiments of the present invention are denoted with the same reference numerals throughout all of the embodiments of the present invention.

First, portions common to all of the embodiments of the present invention will be explained with reference to FIGS. 1–4.

An air cleaner includes an air cleaner casing 10 and a filter element 14. The air cleaner casing 10 can be made from a variety of materials such as synthetic resin. A casing dividing surface 13 divides the air cleaner casing 10 into two portions: an upper casing 11 and a lower casing 12. The upper casing 11 and the lower casing 12 are assembled to permit easy disassembly. When the upper casing 11 and the lower casing 12 are assembled, the upper casing 11 and the lower casing 12 can rotate relative to each other at a hinge 19. The filter element 14 is housed in the air cleaner casing 10, and a peripheral portion of the filter element 14 is held between the upper casing 11 and the lower casing 12 via an elastic seal 15 (e.g., a rubber seal).

Figure 7:
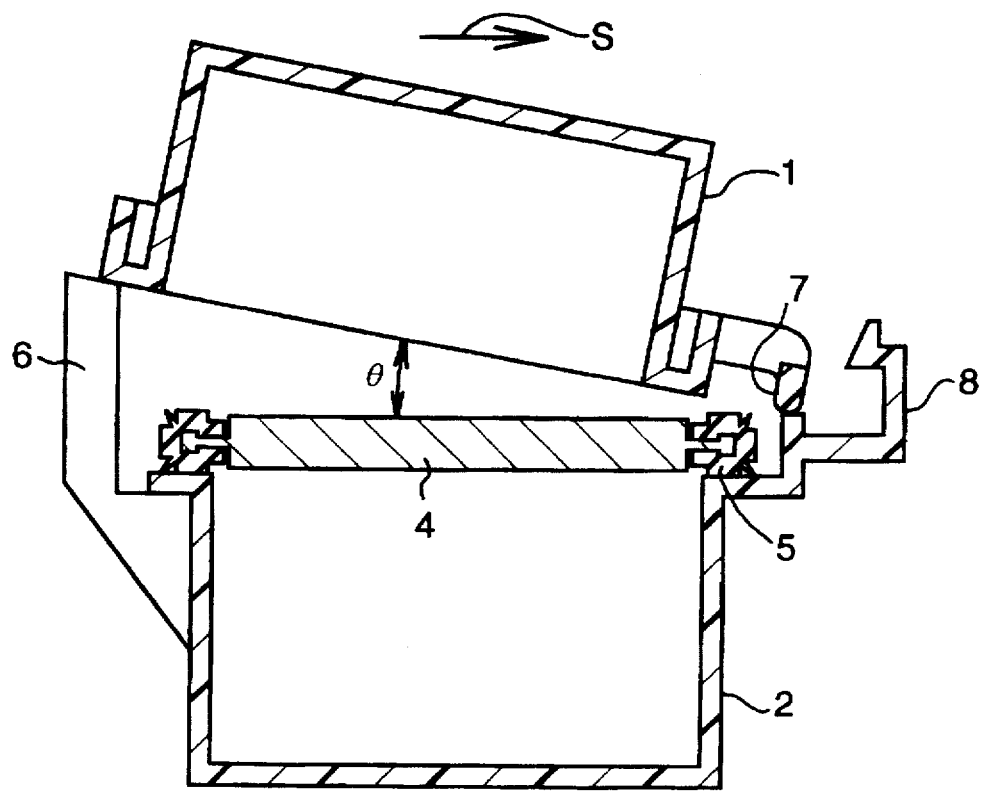
FIG. 7 is a cross-sectional view of an air cleaner casing during assembly of Japanese Patent Application No. HEI 6-205150.
Figure 8:
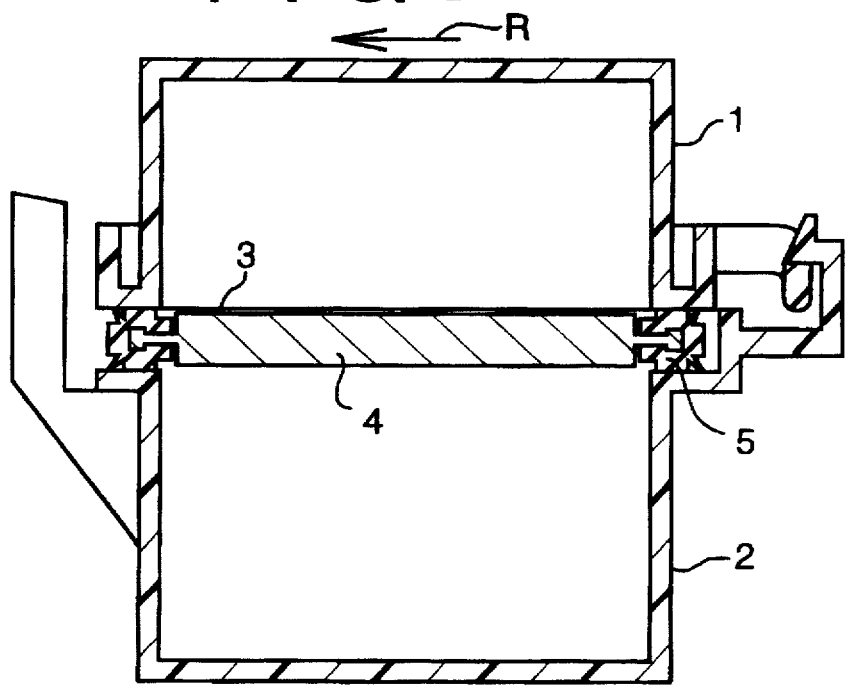
FIG. 8 is a cross-sectional view of the air cleaner casing of FIG. 7 after assembly.
Figure 9:
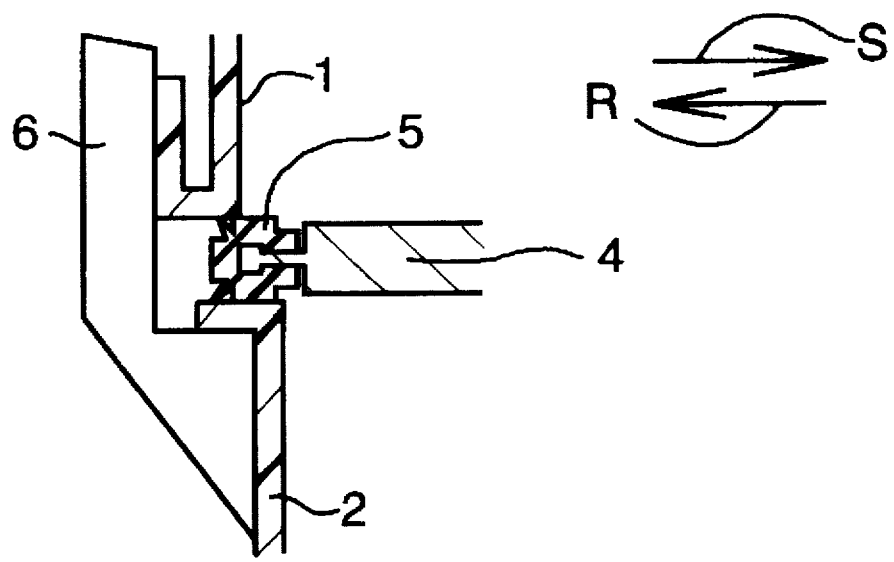
FIG. 9 is a partial, cross-sectional view of the air cleaner casing showing an upper casing dislocated from a lower casing.

During assembly of the upper casing 11 and the lower casing 12, either the upper casing 11 or the lower casing 12 is slid relative to the other casing along the casing dividing surface 13, which is parallel to an upper end of the lower casing 12. In this instance, to prevent the seal surface of the slid casing (for example, the upper casing 11) from bending back the elastic seal 15, the slid casing 11 is inclined by angle θ (see FIG. 7) with respect to the other casing (e.g., the lower casing 12). Inclination of the slid casing is not a prerequisite for sliding. For instance, the upper casing 11 may be slid with the seal surface of the upper casing being parallel to a seal surface of the lower casing 12.

The hinge 19 includes a hinge pin 17 formed in either the upper casing 11 or the lower casing 12 and a hinge retainer 18 formed in the non-hinge pin casing. In the embodiment shown in the drawings, the hinge pin 17 is formed in the upper casing 11 and the hinge retainer 18 is formed in the lower casing 12. The hinge retainer 18 receives the hinge pin 17 when the upper casing 11 is coupled to the lower casing 12. The opening of the hinge retainer 18 has a lateral U-shaped cross section when viewed in a direction parallel to the casing dividing surface 13. The hinge retainer 18 has upper and lower opposed surfaces 18a and 18b formed in a lower surface of an upper leg of the U-shaped cross section and in an upper surface of a lower leg of the U-shaped cross section, respectively. The hinge pin 17 slidably contacts the upper and lower opposed surfaces.

The lower end of the upper casing 11 includes a seal surface 23, which includes a radial outer end, or outermost peripheral end. The upper end of the lower casing 12 includes a seal surface 25. The elastic seal 15 is held between the seal surfaces 23 and 25. The air cleaner casing 10 has a rectangular cross section having four sides. The hinge 19 is formed in one of the four sides, which allows the upper casing 11 and the lower casing 12 to rotate relative to each other. The upper casing 11 has a dislocation preventing wall 16, formed at sides other than the side where the hinge 19 is formed, extending downwards from the outermost peripheral end the seal surface 23 to a position lower than the seal surface 25 of the lower casing 12. The dislocation preventing wall 16 has a lower end. Alternatively, or as a supplement, the dislocation preventing walls 16 may also be formed in the lower casing 12. The dislocation preventing wall 16 prevents relative dislocation between the upper casing 11 and the lower casing 12. The dislocation preventing wall 16 of one of the casings interferes with the outermost end of the seal surface of the other casing in three directions including the coupling direction S and two directions perpendicular to direction S. The dislocation preventing wall cannot be formed in the side where the hinge 19 is formed, because the hinge eliminates the space required for the dislocation preventing wall 16.

A stopper mechanism is formed in the upper casing 11 and the lower casing 12 to prevent relative movement between the upper casing 11 and the lower casing 12 (for example, the upper casing 11) in a direction R reverse to a coupling direction S (defined as a direction, parallel to the casing dividing surface 13, in which the first casing is slid when the first casing is coupled to the second casing) when the upper casing 11 and the lower casing 12 are coupled to each other.

The stopper mechanism includes a stopper 21 formed in the upper casing 11 and another stopper 22 formed in the lower casing 12 which engage each other in direction R reverse to direction S. The stoppers 21 and 22 are formed in at least one of the two sides that are perpendicular to the side where the hinge 19 is formed.

The stopper 21 formed in the upper casing 11 includes a protrusion extending downward from the lower end of the dislocation preventing wall 16 formed in the upper casing 11. The stopper 21 is integrally formed with the upper casing 11.

The lower casing 12 has a side surface 20 and a plurality of ribs 26 which extend downward from the seal surface 25 of the lower casing 12 and are perpendicular to the side surface 20. The stopper 22 formed in the lower casing 12 is formed in one of the ribs 26 which is located closest to the protrusion 21 and is located on a side reverse to the coupling direction with respect to the protrusion 21. The stopper 22 includes a lateral protrusion extending from the rib 26 in a direction away from the side surface 20 of the lower casing 12.

The lateral protrusion 22a and the rib 26, from which the lateral protrusion 22a extends, are reinforced by ribs 27 extending perpendicularly to the ribs 26 from the side reverse to the coupling direction S. The ribs 27 are formed integrally with the side surface 20 of the lower casing 12 and extend parallel to the casing dividing surface 13. Two ribs 27 are formed in the embodiment shown.

As shown, the stoppers 21 and 22 are constructed as integrally molded protrusions, but may be replaced by bolts, screws, pins, and similar elements.

During assembly, a first casing, either the upper casing 11 or the lower casing 12, is slid in coupling direction S relative to the second casing and inclined (or parallel) to the second casing. This permits the hinge pin 17 to be received by the hinge retainer 18. The first casing is then rotated so that the two casings 11 and 12 fully contact each other at the casing dividing surface 13.

When the casings 11 and 12 are coupled, the stopper 21 of the upper casing 11 and the stopper 22 of the lower casing 12 engage each other in direction R reverse to the coupling direction S. Since the upper casing 11 cannot move relative to the lower casing 12 in direction R, dislocation of the upper casing 11 in direction R is prevented. Since the hinge pin 17 contacts a bottom wall of the U-shaped hinge retainer 18 and since the dislocation preventing wall 16 formed in the side opposed to the side where the hinge 19 is formed contacts an outer end of the seal surface 25, dislocation of the upper casing 11 from the lower casing 12 in direction S is prevented. As a result, sealing is ensured by maintaining a sufficient sealing area between the elastic seal member 15 and the seal surfaces of the upper casing 11 and the lower casing 12.

When the air cleaner casing 10 is opened to exchange the filter element 14 or the seal member 15, the upper casing 11 and the lower casing 12 are inclined with respect to each other, thus disengaging the stopper 21 of the upper casing 11 from the stopper 22 of the lower casing 12. After the stoppers are disengaged, the casings can be slid relative to the each other in direction R. In this condition, since casings can be separated from each other, exchange of the filter element or the seal member is possible.

Portions unique to each embodiment of the present invention will now be explained.

In the first embodiment of the present invention, as illustrated in FIG. 4, the upper and lower opposed surfaces 18a and 18b of the hinge retainer 18 are parallel to each other, whereby the distance between the upper and the lower opposed surfaces 18a and 18b is constant over the entire length of the legs of the U-shaped cross section. The distance between the upper and the lower opposed surfaces 18a and 18b is slightly greater than the height of the hinge pin 17.

The size of the hinge pin 17 and hinge retainer 18 are selected to minimize the clearance between the inserted hinge pin 17 and the hinge retainer 18. As a result, the noise generated by intake air pulsations that vibrate the air cleaner is reduced.

In the second and third embodiments of the present invention, as illustrated in FIGS. 5 and 6, the upper and lower opposed surfaces 18a and 18b are not parallel to each other, whereby a distance between the opposed surfaces 18a and 18b is greatest at an entrance of the U-shaped cross section, and is smallest at the bottom of the lateral U-shaped cross section but equal to or slightly greater than the height of the hinge pin 17.

Thus, in the second and third embodiments of the present invention, since the distance between the opposed surfaces 18a and 18b is larger at the entrance of U-shaped cross section, the hinge pin 17 can be easily inserted into the hinge retainer 18. Further, since the distance between the opposed surfaces 18a and 18b is small at the bottom of the U-shaped cross section, clearance between the hinge pin 17 and the hinge retainer 18 is small, thus the hinge pin 17 is unlikely to rattle in the hinge retainer 18 and vibration noise generation is suppressed.

More particularly, in the second embodiment of the present invention, as illustrated in FIG. 5, the upper surface 18a of the opposed surfaces is horizontal, and the lower surface 18b is tapered. The surface 18b is inclined upwardly toward the bottom of the U-shape.

Since the lower surface 18b is tapered, the intersection between the lower surface 18b and the bottom wall 18c of the U-shaped cross section is increased, this configuration produces an intersection with increased stiffness and strength. As a result, when the hinge pin 17 is inserted into the hinge retainer 18, the intersection can resist greater combined forces and moments from the hinge pin 17. Further, when the upper casing 11 is being slid toward the bottom of the U-shaped cross section of the hinge retainer 18, load acting on the elastic seal member 15 is gradually decreased, thus breakage of the elastic seal member 15 is prevented.

In the third embodiment of the present invention, as illustrated in FIG. 6, the lower surface 18b is horizontal, and the upper surface 18a is tapered. The surface 18a is inclined downwardly toward the bottom of the U-shaped cross section.

Since the upper surface 18a is tapered, when the upper casing 11 is being slid toward the bottom of the U-shaped cross section of the hinge retainer 18, a load acting on the elastic member 15 is gradually increased. Therefore, when the hinge pin 17 reaches the deepest position to contact the bottom wall of the U-shaped cross section, the upper casing 11 exerts maximum force on the elastic seal member 15, thus ensuring adequate sealing.

According to the present invention, the following advantages are obtained.

First, since a stopper mechanism prevents one of the upper casing 11 and the lower casing 12 from moving relative to the other, dislocation of the one casing with respect to the other after assembly of the casings 11 and 12 is effectively prevented.

Second, in a case where at least one of the opposed surfaces 18a and 18b of the hinge retainer 18 is tapered, clearance between the hinge pin 17 and the hinge retainer 18 after assembly of the casings 11 and 12 is minimized, thus rattling of the hinge pin 17 in the hinge retainer 18 is effectively prevented.

Third, in a case where the lower opposed surface 18b is tapered, the stiffness and strength of the hinge retainer 18 is increased.

Fourth, in a case where the upper opposed surface 18a is tapered, the pressing force of the upper casing 11 acting on the elastic seal member is greatest after assembly of the casings 11 and 12, thus ensuring adequate sealing.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An automotive air cleaner casing comprising:
   a lower casing having an upper end, a first side, a second side and a first hinge mechanism, wherein the first hinge mechanism is disposed on the first side of the lower casing and the second side is adjacent to the first side;
   an upper casing having a lower end, a first side, a second side and a second hinge mechanism, wherein when said automotive air cleaner casing is closed the upper end and the lower end face each other, the second hinge mechanism is disposed on the first side of the upper casing, and the first side is adjacent to the second side, and said automotive air cleaner is closable by moving said upper casing in a parallel or inclined direction relative to said upper end of said lower case;
   a first stopper being formed in said lower casing on the second side of the lower casing; and
   a second stopper being formed on the second side of the upper casing, wherein said first stopper and said second stopper are engagable for preventing said upper casing from moving relative to said lower casing.

2. The automotive air cleaner casing according to claim 1, wherein the first hinge mechanism comprises a hinge retainer and the second hinge mechanism comprises a hinge pin.

3. The automotive air cleaner casing according to claim 1, wherein said casing has a four-cornered shape.

4. The automotive air cleaner casing according to claim 1, further comprising a filter element, wherein said upper casing has a seal surface at said lower end, said lower casing has a seal surface at said upper end, said seal surfaces hold the filter element, said upper casing has a dislocation preventing wall extending downwards from approximately said seal surface of said upper casing to a point lower than said seal surface of said lower casing when said upper casing and said lower casing are closed, said second stopper is formed as a protrusion extending downwards from said dislocation preventing wall in said upper casing, said lower casing has a rib extending down to a point lower than said seal surface of said lower casing and extending from the side of the lower casing, said first stopper is formed at the rib in a direction parallel to a direction in which said air cleaner is coupled, and said first stopper and said second stopper are engagable with each other to prevent said upper casing from moving relative to said lower casing.

5. The automotive air cleaner casing according to claim 2, wherein
   said hinge retainer receives therein said hinge pin when said upper casing and said lower casing close said automotive air cleaner casing, said hinge retainer having a lateral U-shaped cross section, which has opposed upper and lower surface which said hinge pin slidably contacts, and a distance between said upper surface and said lower surface is smaller in a direction in which said hinge pin slides.

6. The automotive air cleaner casing according to claim 5, wherein said at least one of the upper and lower surface is tapered, thereby making said distance smaller.

7. The automotive air cleaner casing according to claim 5, wherein said upper surface is tapered, thereby making said distance smaller.

8. The automotive air cleaner casing according to claim 7, wherein said lower surface is tapered, thereby making said distance smaller.

9. An automotive air cleaner casing comprising:

a lower casing having an upper end and a hinge retainer;

an upper casing having a lower end and a hinge pin, wherein when said automotive air cleaner casing is closed the upper end and the lower and face each other, said automotive air cleaner is closable by moving said upper casing in a parallel or an inclined direction relative to said upper end of said lower case, said hinge retainer has a lateral U-shaped cross section which has opposed upper and lower surfaces, and a distance between said upper and lower surfaces is smaller in a direction in which the hinge pin slides.

10. An automotive air cleaner casing comprising:

a lower casing having an upper end and a hinge pin;

an upper casing having a lower end and a hinge retainer, wherein when said automotive air cleaner casing is closed the upper end and the lower end face each other, said automotive air cleaner is closable by moving said upper casing in a parallel or an inclined direction relative to said upper end of said lower case, said hinge retainer has a lateral U-shaped cross section which has opposed upper and lower surfaces, and a distance between said upper and lower surfaces is smaller in a direction in which the hinge pin slides.

11. The automotive air cleaner casing according to claim 9, wherein at least one of the upper or lower surfaces is tapered, thereby making the distance between the upper and lower surfaces smaller.

12. The automotive air cleaner casing according to claim 9, wherein the upper surface is tapered, thereby making the distance between the upper and lower surfaces smaller.

13. The automotive air cleaner casing according to claim 9, wherein the lower surface is tapered, thereby making the distance between the upper and lower surfaces smaller.

14. The automotive air cleaner casing according to claim 10, wherein at least one of the upper or lower surfaces is tapered, thereby making the distance between the upper and lower surfaces smaller.

15. The automotive air cleaner casing according to claim 10, wherein the upper surface is tapered, thereby making the distance between the upper and lower surfaces smaller.

16. The air automotive cleaner casing according to claim 10, wherein the lower surface is tapered, thereby making the distance between the upper and lower surfaces smaller.

17. The automotive air cleaner casing according to claim 1, wherein the first hinge mechanism comprises a hinge pin and the second hinge mechanism comprises a hinge retainer.

18. The air cleaner according to claim 2, further comprising a filter element, wherein said upper casing has a seal surface at said lower end, said lower casing has a seal surface at said upper end, said seal surfaces hold the filter element, said upper casing has a dislocation preventing wall extending downwards from approximately said seal surface of said upper casing to a point lower than said seal surface of said lower casing when said upper casing and said lower casing are closed, said second stopper is formed as a protrusion extending downwards from said dislocation preventing wall in said upper casing, said lower casing has a rib extending down to a point lower than said seal surface of said lower casing and extending from the side of the lower casing, said first stopper is formed at the rib in a direction parallel to a direction in which said air cleaner is coupled, and said first stopper and said second stopper are engagable with each other to prevent said upper casing from moving relative to said lower casing.

19. The automotive air cleaner according to claim 17, further comprising a filter element, wherein said upper casing has a seal surface at said lower end, said lower casing has a seal surface at said upper end, said seal surfaces hold the filter element, said upper casing has a dislocation preventing wall extending downwards from approximately said seal surface of said upper casing to a point lower than said seal surface of said lower casing when said upper casing and said lower casing are closed, said second stopper is formed as a protrusion extending downwards from said dislocation preventing wall in said upper casing, said lower casing has a rib extending down to a point lower than said seal surface of said lower casing and extending from the side of the lower casing, said first stopper is formed at the rib in a direction parallel to a direction in which said air cleaner is coupled, and said first stopper and said second stopper are engagable with each other to prevent said upper casing from moving relative to said lower casing.

20. The automotive air cleaner casing according to claim 17, wherein said hinge retainer receives therein said hinge pin when said upper casing and said lower casing close said automotive air cleaner casing, said hinge retainer having a lateral U-shaped cross section, which has opposed upper and lower surfaces which said hinge pin slidably contacts, and a distance between said upper surface and said lower surface is smaller in a direction in which said hinge pin slides.

* * * * *

UNITED STATES PATENT AND TRADEMARK OFFICE
CERTIFICATE OF CORRECTION

PATENT NO. : 5,730,768
DATED : Mar. 24, 1998
INVENTOR(S) : Kouichi Kaminaga, et al It is certified that error appears in the above-identified patent and that said Letters Patent is hereby corrected as shown below:

| Column | Line | |
|---|---|---|
| 6 | 55 | Change "surface" to --surfaces--. |
| 7 | 5 | Change "and face" to --end face--. |

Signed and Sealed this

Eighth Day of September, 1998

Attest:

BRUCE LEHMAN

*Attesting Officer*     *Commissioner of Patents and Trademarks*